United States Patent
Akbik et al.

(10) Patent No.: US 10,042,846 B2
(45) Date of Patent: Aug. 7, 2018

(54) CROSS-LINGUAL INFORMATION EXTRACTION PROGRAM

(71) Applicant: International Business Machines Corporation, Armonk, NY (US)

(72) Inventors: Alan Akbik, Berlin (DE); Laura Chiticariu, San Jose, CA (US); Marina Danilevsky Hailpern, San Jose, CA (US); Yunyao Li, San Jose, CA (US); Huaiyu Zhu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/141,577

(22) Filed: Apr. 28, 2016

(65) Prior Publication Data
US 2017/0315986 A1 Nov. 2, 2017

(51) Int. Cl.
*G06F 17/28* (2006.01)
*G06F 17/27* (2006.01)
*G06F 17/24* (2006.01)

(52) U.S. Cl.
CPC .......... *G06F 17/289* (2013.01); *G06F 17/241* (2013.01); *G06F 17/2705* (2013.01); *G06F 17/275* (2013.01); *G06F 17/2785* (2013.01)

(58) Field of Classification Search
CPC .................................................. G06F 17/289
See application file for complete search history.

(56) References Cited

U.S. PATENT DOCUMENTS

| | | | |
|---|---|---|---|
| 6,006,221 A | 12/1999 | Liddy et al. | |
| 6,076,088 A * | 6/2000 | Paik | G06F 17/30707 |
| 8,131,540 B2 | 3/2012 | Marchisio et al. | |
| 8,812,292 B2 | 8/2014 | Ceusters et al. | |
| 9,262,406 B1 * | 2/2016 | Das | G06F 17/289 |
| 2005/0022115 A1 * | 1/2005 | Baumgartner | G06F 17/30911 |
| | | | 715/205 |

(Continued)

OTHER PUBLICATIONS

Dumais, Susan T. et al., "Automatic Cross-Language Retrieval Using Latent Semantic Indexing", AAAI-97 Spring Symposium Series: Cross-Language Text and Speech Retrieval, Mar. 24-26, 1997, 7 pages, Stanford University, AAAI Technical Report SS-97-05, www.aaai.org.

(Continued)

*Primary Examiner* — Douglas Godbold
(74) *Attorney, Agent, or Firm* — Ference & Associates LLC (57) ABSTRACT

One embodiment provides method for constructing a cross-lingual information extraction program, the method including: utilizing at least one processor to execute computer code that performs the steps of: constructing a plurality of language-specific representations from text expressed in a plurality of languages by parsing the text of each language using a language-specific semantic parser; mapping the plurality of language-specific representations to a single cross-lingual semantic representation, wherein the cross-lingual semantic representation encompasses the plurality of languages; and constructing the cross-lingual information extraction program based on the cross-lingual semantic representation. Other aspects are described and claimed.

20 Claims, 7 Drawing Sheets

(56) References Cited

U.S. PATENT DOCUMENTS

| | | | |
|---|---|---|---|
| 2007/0094006 A1* | 4/2007 | Todhunter | G06F 17/2785 704/8 |
| 2008/0306726 A1 | 12/2008 | Levy | |
| 2009/0192954 A1* | 7/2009 | Katukuri | G06F 17/3061 706/11 |
| 2011/0184718 A1* | 7/2011 | Chen | G06F 17/274 704/2 |
| 2013/0041652 A1 | 2/2013 | Zuev et al. | |
| 2014/0046877 A1* | 2/2014 | Gopalakrishnan | G06F 17/28 706/12 |
| 2014/0114649 A1* | 4/2014 | Zuev | G06F 17/289 704/9 |
| 2014/0201838 A1 | 7/2014 | Varsanyi et al. | |
| 2016/0004766 A1* | 1/2016 | Danielyan | G06F 17/30663 707/723 |
| 2016/0048504 A1* | 2/2016 | Narayanan | G06F 17/2755 704/9 |
| 2016/0335544 A1* | 11/2016 | Bretschneider | G06N 5/022 |
| 2017/0103062 A1* | 4/2017 | Zhang | G06F 17/289 |

OTHER PUBLICATIONS

Riloff, Ellen et al., "Inducing Information Extraction Systems for New Languages via Cross-Language Projection", In Proceedings of the 19th International Conference on Computational Linguistics (COLING 2002), Aug. 26-30, 2002, Taipei, Taiwan, 7 pages, Association for Computational Linguistics, Stroudsburg, PA, USA.

Sudo, Kiyoshi et al., "Cross-lingual Information Extraction System Evaluation", Proceedings of the 20th International Conference on Computational Linguistics (COLING '04), Article No. 882, Aug. 23-27, 2004, University of Geneva, Switzerland, 8 pages, Association for Computational Linguistics, Stroudsburg, PA, USA.

\* cited by examiner

"CorpBuy acquired CorpBought. BuyingCorps Übernahme von BoughtCorp." — 401

Actions — 402

| ActionID | Text | Action-Evoking Element | Action Class | Tense | Mood |
|---|---|---|---|---|---|
| 4 | CorpBuy acquired CorpBought | acquired | ACQUIRE.01 | Past tense | indicative |
| 6 | BuyingCorps Übernahme von BoughtCorp | Übernahme | ACQUIRE.01 | None | indicative |

Roles — 403

| ActionID | RoleType | Value |
|---|---|---|
| 4 | Buyer | CorpBuy |
| 4 | THING BOUGHT | CorpBought |
| 6 | BUYER | BuyingCorp |
| 6 | THING BOUGHT | BoughtCorp |

CROSS-LINGUAL INFORMATION EXTRACTION PROGRAM

BACKGROUND

Information extraction (IE) is the process of extracting structured information from unstructured (or semi-structured) text. Information extraction is different from information retrieval in that an information extraction program results in structured information extracted from an input text. Information retrieval, on the other hand, results in a listing of all documents or texts that include the keywords contained within the query. Therefore, in order for an information extractor to correctly extract structured information, a user is required to identify rules or patterns to define the extractors. Based upon the unstructured text, it may be difficult to make a single extractor which has widespread applicability. Rather, the extractor may only be able to be used on a single type of information or text.

BRIEF SUMMARY

In summary, one aspect of the invention provides a method for constructing a cross-lingual information extraction program, the method comprising: utilizing at least one processor to execute computer code that performs the steps of: constructing a plurality of language-specific representations from text expressed in a plurality of languages by parsing the text of each language using a language-specific semantic parser; mapping the plurality of language-specific representations to a single cross-lingual semantic representation, wherein the cross-lingual semantic representation encompasses the plurality of languages; and constructing the cross-lingual information extraction program based on the cross-lingual semantic representation.

Another aspect of the invention provides an apparatus for constructing a cross-lingual information extraction program, the apparatus comprising: at least one processor; and a computer readable storage medium having computer readable program code embodied therewith and executable by the at least one processor, the computer readable program code comprising: computer readable program code that constructs a plurality of language-specific representations from text expressed in a plurality of languages by parsing the text of each language using a language-specific semantic parser; computer readable program code that maps the plurality of language-specific representations to a single cross-lingual semantic representation, wherein the cross-lingual semantic representation encompasses the plurality of languages; and computer readable program code that constructs the cross-lingual information extraction program based on the cross-lingual semantic representation.

An additional aspect of the invention provides a computer program product for constructing a cross-lingual information extraction program, the computer program product comprising: a computer readable storage medium having computer readable program code embodied therewith, the computer readable program code comprising: computer readable program code that constructs a plurality of language-specific representations from text expressed in a plurality of languages by parsing the text of each language using a language-specific semantic parser; computer readable program code that maps the plurality of language-specific representations to a single cross-lingual semantic representation, wherein the cross-lingual semantic representation encompasses the plurality of languages; and computer readable program code that constructs the cross-lingual information extraction program based on the cross-lingual semantic representation.

A further aspect of the invention provides a method for creating a cross-lingual information extraction program, the method comprising: receiving a plurality of phrases, wherein the plurality of phrases comprises phrases expressed in more than one language; parsing, using a language-specific semantic parser, each of the plurality of languages; constructing a plurality of language-specific representations of each of the parsed plurality of languages; mapping the plurality of language-specific representations to a language-invariant representation; creating the cross-lingual information extraction program using the language-invariant representation; and applying the cross-lingual information extraction program to extract information from text in a language.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-6 can be performed or utilized by way of a processing unit or units and system memory such as those indicated, respectively, at 16' and 28' in FIG. 7, whether on a server computer, a client computer, a node computer in a distributed network, or any combination thereof.

An information extraction (IE) program is a computer program that automatically extracts structured information from unstructured text. One common use of an information extraction program is extracting information from natural language text. However, extracting structured information from natural language text can be difficult because information can be expressed in many different languages. Even within the same language, the same information can be expressed in different ways. For example, the sentence "Levi ate a hamburger" can also be expressed as "a hamburger was eaten by Levi." The same information is conveyed in both sentences (i.e., Levi consumed a hamburger); however, the syntax of each of the sentences is different.

Due to the complexity of different languages, an extractor must be created for each language. Creating an extractor for each language is very labor intensive. Generally, a user formulates rules or patterns to define extractors. For example, whenever a specific pattern matches a text segment, a relation instance is extracted. Each language has sentence structures and language rules unique to that language. These different structures and language rules result in problems for creating extractor rules that encompass all languages. For example, an extractor rule, created for one language, indicating that a text segment matching a specific pattern identifies a certain sentence structure, does not indicate that a text segment matching the same pattern in another language identifies that same sentence structure. Therefore, writing rules for information extractors is time consuming and labor intensive in part because different rules must be written for each language.

Accordingly, an embodiment provides a method of constructing a cross-lingual information extraction program. An embodiment constructs a plurality of language-specific representations based on text (e.g., phrase, sentence, etc.) from a plurality of languages. In one embodiment, one text may be in the same language as another of the text. However, the texts may be expressed in different formats. In constructing these language-specific representations, an embodiment may parse the text using a language-specific semantic parser. In one embodiment, the semantic parser may include a semantic role labeler which labels or annotates the semantic roles of words contained within the text in relation to a reference word. In one embodiment, the reference word may be the verb or action-inducing word of the text. The roles of the other words within the text may then be identified based upon their semantic role in relation to the verb of the text. For example, an embodiment may identify the arguments of the verb.

An embodiment may then map the plurality of language-specific representations to a single cross-lingual semantic representation. The information extraction program can then be expressed in terms of the cross-lingual semantic representation. Once the information extraction program is created, it can then be used to extract structured information from texts. For example, an embodiment may use the information extraction program to query a cross-lingual semantic representation of text to extract structured information.

Such a system provides a technical improvement over current systems for extracting structured information from texts. A single information extraction program can be constructed and then used on text expressed in different formats and also text from many different languages. Thus, a user only has to create rules for a single extraction program, rather than creating rules and an extraction program for each language. Additionally, such an information extraction program can be used on languages that are not previously known by the system.

Figure 1:
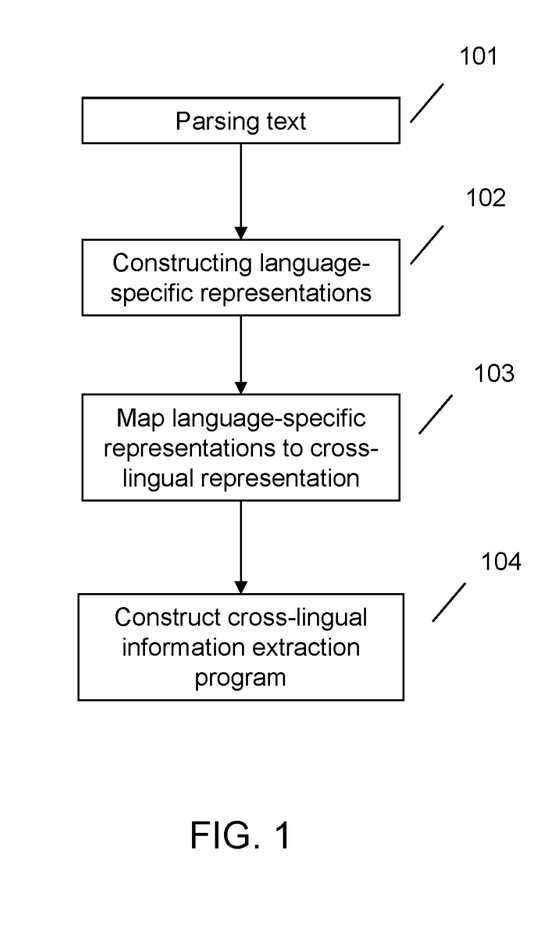
FIG. 1 illustrates a method of creating a cross-lingual information extraction program.
Figure 2:
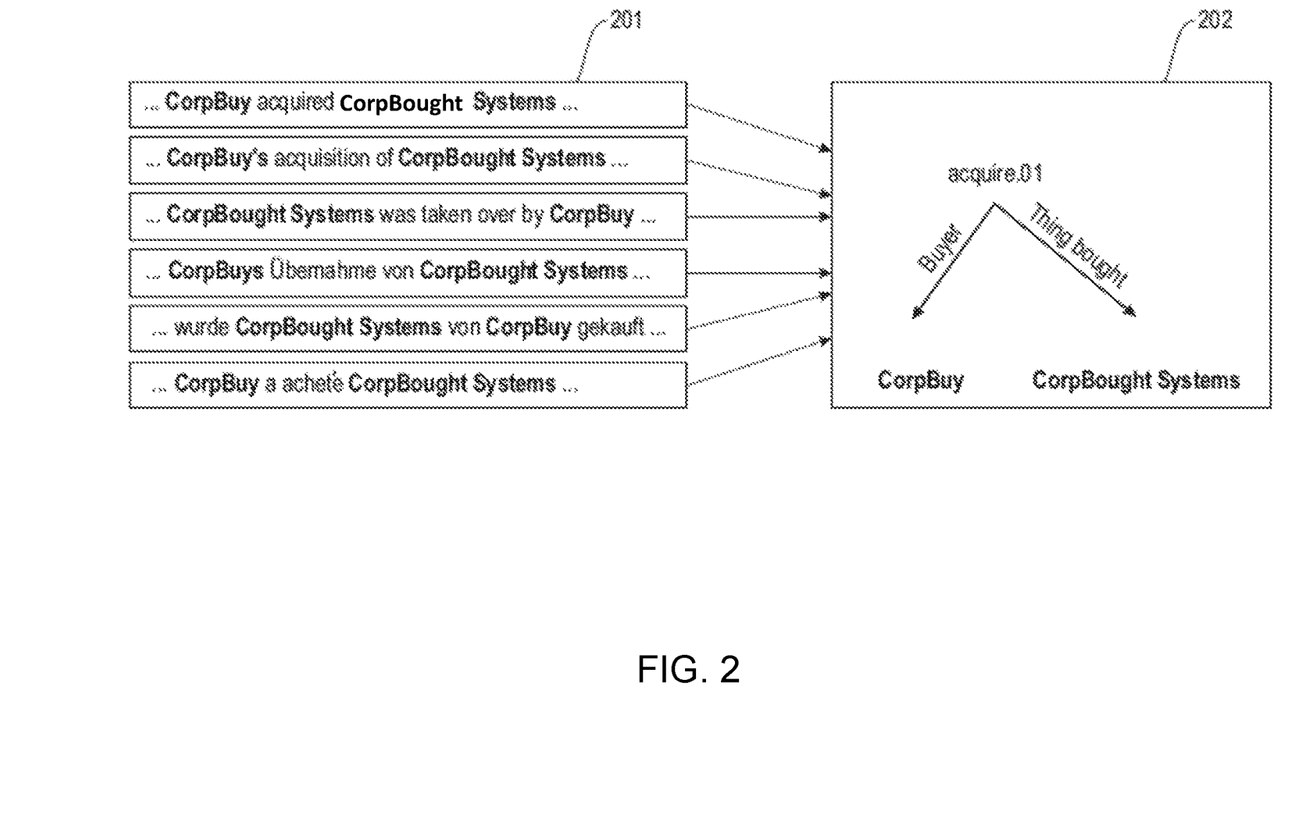
FIG. 2 illustrates an exemplary language-independent representation of input text.

Referring now to FIG. 1, an embodiment may parse text using a language-specific semantic parser at 101. The text may be expressed as a phrase, sentence, or other language structure. The texts received may include similar text expressed in a variety of formats or languages. For example, referring to FIG. 2, the input 201 is shown as six different phrases conveying the same information. Three of the phrases are in English, but are expressed in different formats. Two of the phrases are in German expressed in different formats. The last phrase is expressed in French. As can be seen from FIG. 2, the plurality of text received all convey the same idea, but are expressed in different formats and additionally in different languages.

To parse the texts, a language-specific semantic parser may be used. The language-specific semantic parser may be dependent on the language of the text. In other words, the semantic parser may be trained based upon the language of the text. The training of the semantic parser may include training based upon a labeled dataset. The labeled dataset may be manually annotated by a user or may be automatically generated using different techniques. For example, one technique for generating a labeled dataset for training the semantic parser is annotation projection.

In one embodiment, the semantic parser may be a semantic role labeler (SRL). A semantic role labeler may identify and additionally annotate or label the words included in the text with their semantic roles. In one embodiment, the roles may be identified in relation to a reference word within the text. For example, an embodiment may identify the action word or verb of the text. The remaining words may then be labeled or annotated based upon their relationship to the reference word, or identified verb in this example. For example, an embodiment may label the arguments of the verb. Not every word included in the text may be labeled or identified.

At 102, an embodiment may construct a plurality of language-specific representations from the parsed text. The language-specific representations may be created for each of the input texts. For example, referring to FIG. 2, a language-specific representation may be created for each of the six input texts 201, resulting in a total of six language-specific representations. A language-specific representation may not be created for every input text. If a language-specific representation cannot be created for an input text, then that input text may be ignored. For example, if a semantic parser does not exist or is inaccessible for one of the languages of the input text, then a language-specific representation may not be able to be created.

Figure 3:
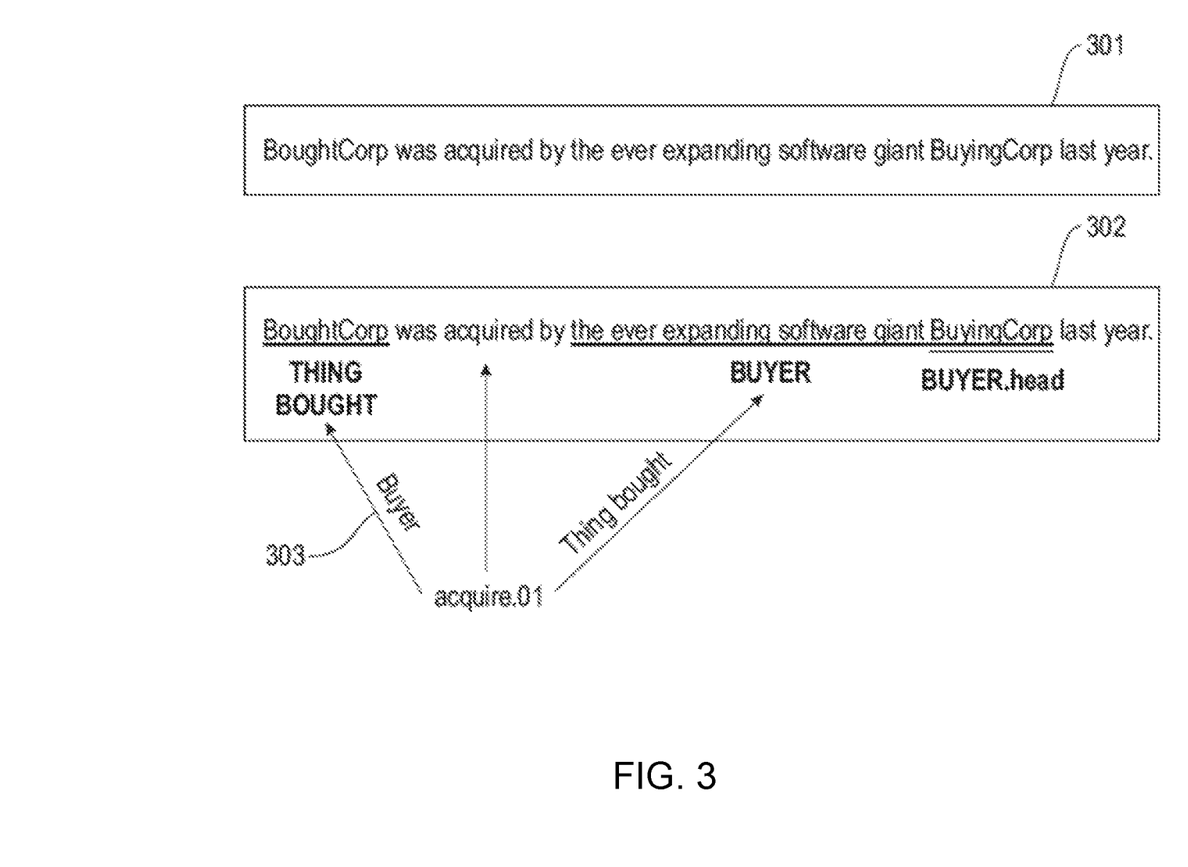
FIG. 3 illustrates another exemplary language-independent representation of input text.
Figure 4:
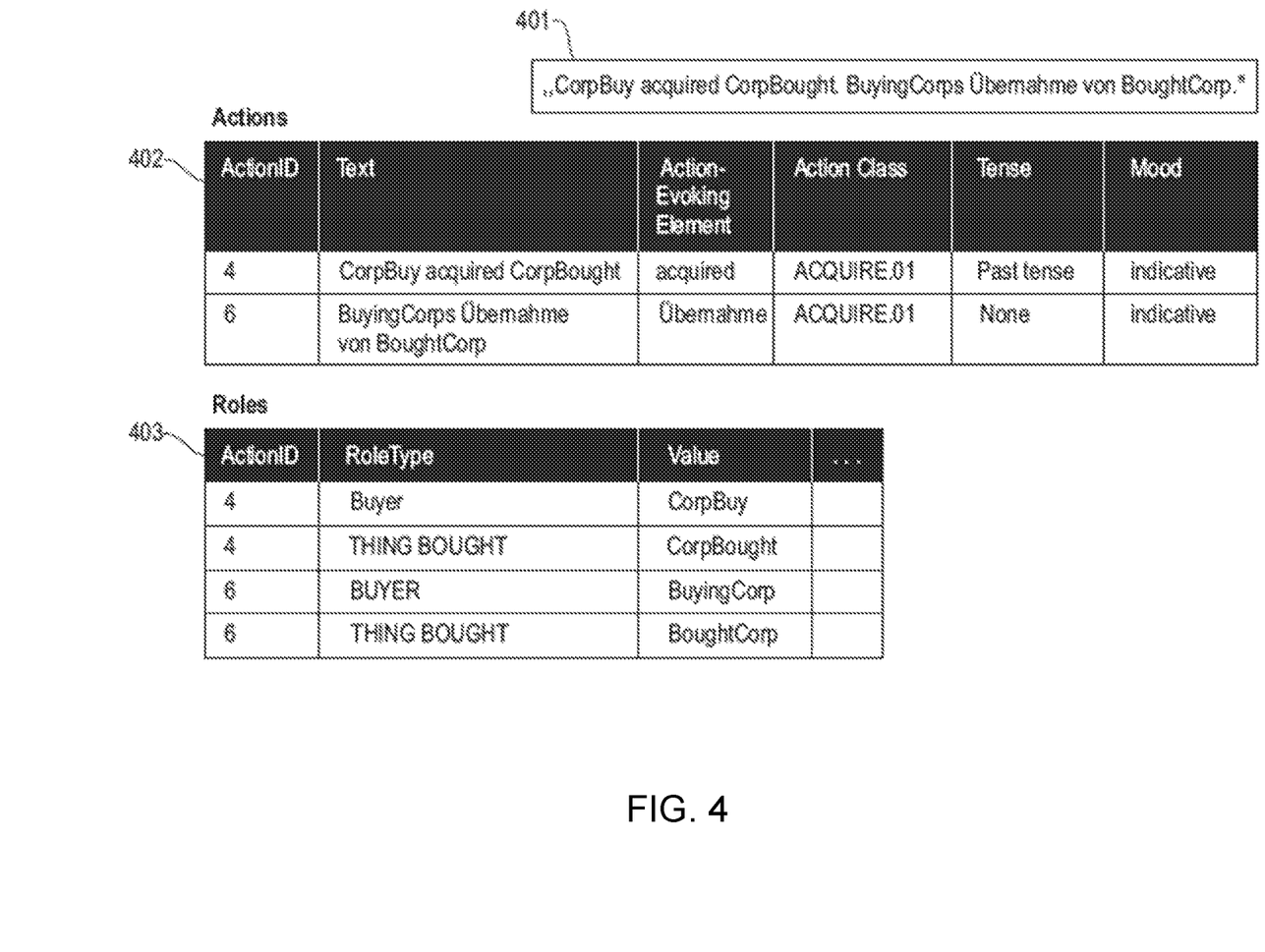
FIG. 4 illustrates another exemplary language-independent representation of input text.
Figure 5:
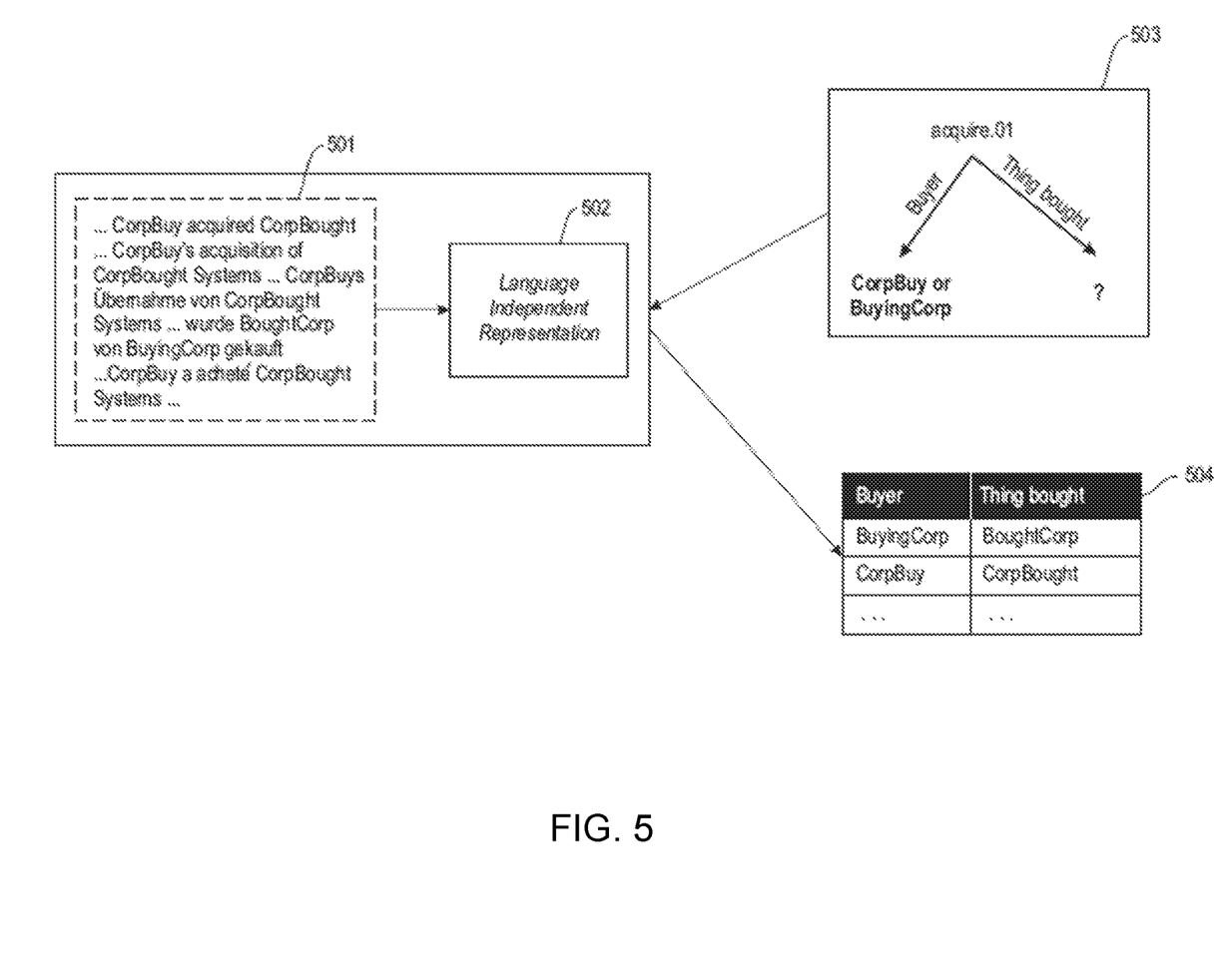
FIG. 5 illustrates an exemplary cross-lingual information extraction program.

As an example in constructing a language-specific representation, referring to FIG. 3, an embodiment may receive input text 301. The text may then be parsed using a semantic parser that identifies the role of the words contained within the text, resulting in a language-specific representation 302. As can be seen in FIG. 3, not all words included in the input text have been annotated. For example, the language-specific representations may be an abstraction. Such an abstraction may ignore characteristics and words included in the text. For example, using FIG. 3 as an example, an abstraction may ignore the adjectives (e.g., "software", "giant", etc.) in identifying the roles of words within the text. The language-specific representation or abstraction may be a textual representation having annotations as shown in FIG. 3. However, the language-specific representation or abstraction may be shown or expressed in other ways. For example, the representation may be shown as a graph, sentence tree, concept graph, table, and the like.

An embodiment may then map the language-specific representations to a cross-lingual semantic representation at 103. In mapping the language-specific representations to a cross-lingual semantic representation, an embodiment may link each of the semantic representations or abstractions to a unified semantic representation. The cross-lingual mapping from the language-specific representations to the cross-lingual semantic representations may be determined from bi-text, parallel text, or other lingual alignment techniques.

The cross-lingual semantic representation is language independent. In other words, this cross-lingual semantic representation is not dependent or based on any particular language. Rather, the cross-lingual semantic representation is structured as a graphical representation that identifies the semantic relationship between words contained within the text without regard for the language of the text. This cross-lingual semantic representation is language-invariant, meaning it does not change based upon any language of the underlying text or language-specific representation. In other words, the cross-lingual semantic representation encompasses the plurality of languages. For example, referring to FIG. 2, the six input texts 201 are parsed and mapped to a cross-lingual semantic representation 202. As another example, referring to FIG. 3, the language-specific representation 302 may be mapped to a language-independent representation 303.

In one embodiment, the cross-lingual or language-independent representation may include both semantic and syntactic components. For example, the cross-lingual representation may include not only the function or role of the word, but also additional cross-language components such as tense (e.g., past, present, future, etc.), mood (e.g., indicative, imperative, etc.), sentiment (e.g., negative, positive, etc.), and the like. These cross-language components may have been identified during the semantic parsing of the text or may be identified during the mapping of the language-specific representations to the cross-lingual representations. For example, referring to FIG. 4, the input text 401 may be parsed and additional semantic and syntactic components may be identified as shown in action table 402. As shown in action table 402, the action-evoking element or verb is identified including additional semantic and syntactic components related to the action-evoking element. Additionally, words having roles as related to the reference word (i.e., the action-evoking element in this example) are identified as in roles table 403.

Once the language-specific representations have been mapped to a cross-lingual representation at 103, an embodiment may construct a cross-lingual information extraction program at 104 based on the cross-lingual semantic representation. The information extraction program may be expressed in terms of the cross-lingual representation. For example, the information extraction program may be formulated as a set of rules that are created based upon the cross-lingual representation. In other words, the rules that are normally used to train an information extraction program can be created based upon the cross-lingual representation. The information extraction program may also be formulated in a language-independent abstraction, for example, as shown at 503 in FIG. 5.

The information extraction program may be used to extract information from text. Since the information extraction program is language independent, it can be used on text in any format or language, as long as a semantic parser has been developed or is accessible by an embodiment. In other words, an embodiment does not have be trained on a language of the text. Using the semantic parser of the language, the information extraction program can still extract structured information from the text. In extracting information from text, the information extraction program may query a language-specific representation or cross-lingual semantic representation of the text. In querying the text, the extraction program may identify a target word and then request an argument associated with that target word. As an example, referring to FIG. 5, the information extraction program 503, may be expressed as a formula that requests the "Thing Bought" argument of the verb "acquire" from the input text 501 or language-independent representation 502. The information extracted may then be displayed as structured information, for example, in an information table 504.

Figure 6:
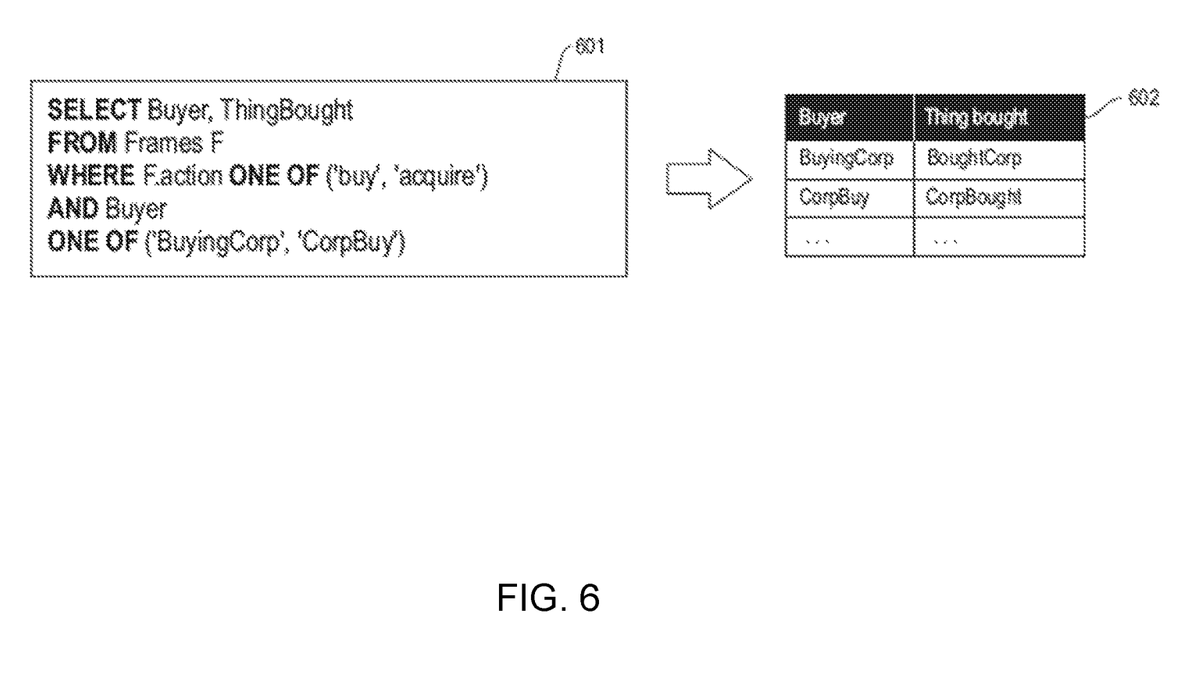
FIG. 6 illustrates another exemplary cross-lingual information extraction program.

As another example, referring to FIG. 6, the information extraction program may be expressed in terms of the language-independent representation as shown at 601. As seen in this example information extraction program, the program requests the Buyer and ThingBought arguments of the verbs "buy" and "acquire", where the Buyer is one of "CorpBuy" and "BuyingCorp". As can be understood by one skilled in the art, the information extraction program as shown in FIG.

6 is merely an example. The information extraction program may be structured or coded differently than shown in the example. The results of the information extraction program, as applied to the input text of FIG. 4 at 401, may then be shown as structured information in a table as shown at 602. In this table, the first column contains the value of the Buyer argument and the second column contains the value of the ThingBought argument. As can be seen, the information extracted matches in both languages. In other words, the result of the information extraction program consists of one tuple (i.e., "BuyingCorp" "BoughtCorp") extracted from the English text and one tuple (i.e., "CorpBuy" "CorpBought") extracted from the German text.

Figure 7:
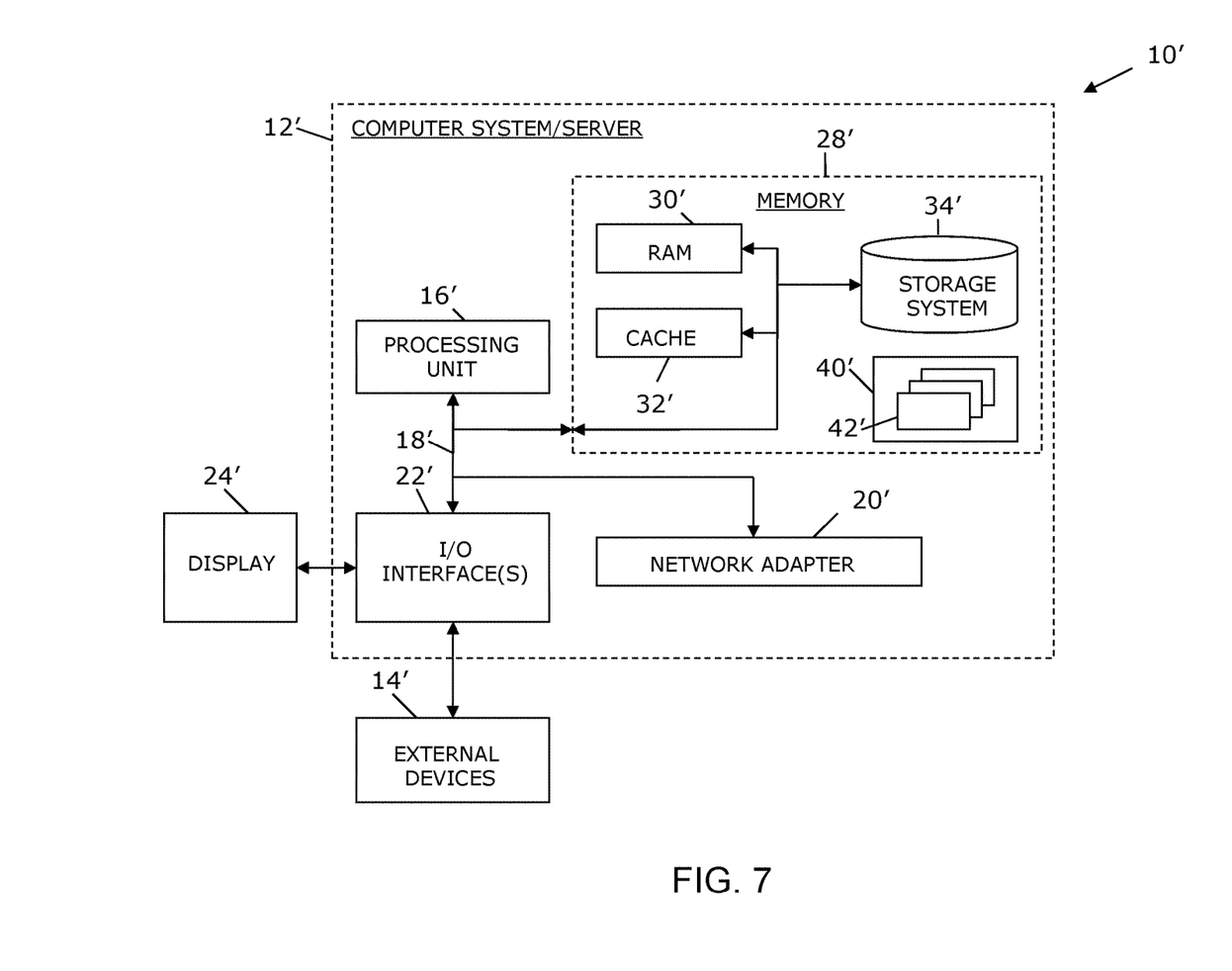
FIG. 7 illustrates a computer system.

As shown in FIG. 7, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for constructing a cross-lingual information extraction program, the method comprising:
   utilizing at least one processor to execute computer code that performs the steps of:
   constructing a plurality of language-specific representations from text expressed in a plurality of languages by parsing the text of each language using a language-specific semantic parser;
   mapping the plurality of language-specific representations to a single cross-lingual semantic representation, wherein the cross-lingual semantic representation is language independent, language-invariant, and encompasses the plurality of languages, wherein the cross-lingual semantic representation comprises a graphical representation that identifies the semantic relationship between words contained within a text without regard for language of the text and comprises semantic and syntactic components;
   constructing the cross-lingual information extraction program based on the cross-lingual semantic representation, wherein the cross-lingual information extraction program comprises a set of rules created from the cross-lingual semantic representation and wherein the cross-lingual information extraction program is language independent and facilitates extraction of structured information from unstructured text different from the text expressed in a plurality of languages; and
   extracting structured information from texts in a language using the constructed cross-lingual information extraction program.

2. The method of claim 1, comprising extracting information from text by querying the cross-lingual information extraction program against a cross-lingual semantic representation of the text.

3. The method of claim 2, wherein the querying comprises requesting an argument associated with a target word contained within the text.

4. The method of claim 2, wherein the extracted information comprises structured information.

5. The method of claim 1, wherein the language-specific semantic parser comprises a semantic role labeler.

6. The method of claim 5, wherein at least one word contained within the text is identified as an action-inducing word.

7. The method of claim 6, wherein at least one word contained within the text is annotated with a semantic role with respect to the action-inducing word.

8. The method of claim 1, wherein the text expressed in a plurality of languages comprises syntactically different text of a single language.

9. An apparatus for constructing a cross-lingual information extraction program, the apparatus comprising:
at least one processor; and
a computer readable storage medium having computer readable program code embodied therewith and executable by the at least one processor, the computer readable program code comprising:
computer readable program code that constructs a plurality of language-specific representations from text expressed in a plurality of languages by parsing the text of each language using a language-specific semantic parser;
computer readable program code that maps the plurality of language-specific representations to a single cross-lingual semantic representation, wherein the cross-lingual semantic representation is language independent, language-invariant, and encompasses the plurality of languages, wherein the cross-lingual semantic representation comprises a graphical representation that identifies the semantic relationship between words contained within a text without regard for language of the text and comprises semantic and syntactic components;
computer readable program code that constructs the cross-lingual information extraction program based on the cross-lingual semantic representation, wherein the cross-lingual information extraction program comprises a set of rules created from the cross-lingual semantic representation and wherein the cross-lingual information extraction program is language independent and facilitates extraction of structured information from unstructured text different from the text expressed in a plurality of languages; and
computer readable program code that extracts structured information from texts in a language using the constructed cross-lingual information extraction program.

10. A computer program product for constructing a cross-lingual information extraction program, the computer program product comprising:
a computer readable storage medium having computer readable program code embodied therewith, the computer readable program code comprising:
computer readable program code that constructs a plurality of language-specific representations from text expressed in a plurality of languages by parsing the text of each language using a language-specific semantic parser;
computer readable program code that maps the plurality of language-specific representations to a single cross-lingual semantic representation, wherein the cross-lingual semantic representation is language independent, language-invariant, and encompasses the plurality of languages, wherein the cross-lingual semantic representation comprises a graphical representation that identifies the semantic relationship between words contained within a text without regard for language of the text and comprises semantic and syntactic components;
computer readable program code that constructs the cross-lingual information extraction program based on the cross-lingual semantic representation, wherein the cross-lingual information extraction program comprises a set of rules created from the cross-lingual semantic representation and wherein the cross-lingual information extraction program is language independent and facilitates extraction of structured information from unstructured text different from the text expressed in a plurality of languages; and
computer readable program code that extracts structured information from texts in a language using the constructed cross-lingual information extraction program.

11. The computer program product of claim 10, wherein the computer readable program code comprises code that extracts information from text by querying the cross-lingual information extraction program against a cross-lingual semantic representation of the text.

12. The computer program product of claim 11, wherein the computer readable program code that queries comprises code that requests an argument associated with a target word contained within the text.

13. The computer program product of claim 11, wherein the extracted information comprises structured information.

14. The computer program product of claim 10, wherein the language-specific semantic parser comprises a semantic role labeler.

15. The computer program product of claim 14, wherein at least one word contained within the text is identified as an action-inducing word.

16. The computer program product of claim 15, wherein at least one word contained within the text is annotated with a semantic role with respect to the action-inducing word.

17. The computer program product of claim 10, wherein the text expressed in a plurality of languages comprises syntactically different text of a single language.

18. A method for creating a cross-lingual information extraction program, the method comprising:
receiving a plurality of phrases, wherein the plurality of phrases comprises phrases each of which is expressed in more than one language;
parsing, using a language-specific semantic parser, each of the plurality of languages;
constructing a plurality of language-specific representations of each of the parsed plurality of languages;
mapping the plurality of language-specific representations to a language-invariant representation, wherein the language-invariant representation is language independent, encompasses the plurality of languages and comprises a graphical representation that identifies the semantic relationship between words contained within a phrase without regard for language of the phrase and comprises semantic and syntactic components;
creating the cross-lingual information extraction program using the language-invariant representation, wherein the cross-lingual information extraction program comprises a set of rules created from the language-invariant representation and wherein the cross-lingual information extraction program is language independent and facilitates extraction of structured information from unstructured text different from the text expressed in a plurality of languages; and
extracting structured information from texts in a language using the constructed cross-lingual information extraction program.

19. The method of claim 18, comprising applying the cross-lingual information extraction program to extract information from text in a language.

20. The method of claim 18, wherein the language-specific representation comprises a sense of an action-inducing word contained within the phrase and a semantic role of at least one argument of the action-inducing word.

* * * * *